US010814250B2

(12) United States Patent
Ramakrishnan et al.

(10) Patent No.: US 10,814,250 B2
(45) Date of Patent: Oct. 27, 2020

(54) EFFICIENT AUTOMATIC LIQUID-LIQUID EXTRACTING MACHINE

(71) Applicant: Ram Ramakrishnan, Sugar Land, TX (US)

(72) Inventors: Ram Ramakrishnan, Sugar Land, TX (US); Janardhan Dongre, Humble, TX (US); Yuhui Zhang, Pearland, TX (US)

(73) Assignee: Ram Ramakrishnan, Sugar Land, TX (US)

( * ) Notice: Subject to any disclaimer, the term of this patent is extended or adjusted under 35 U.S.C. 154(b) by 0 days.

(21) Appl. No.: 16/392,661

(22) Filed: Apr. 24, 2019

(65) Prior Publication Data

US 2020/0215456 A1     Jul. 9, 2020

(30) Foreign Application Priority Data

Jan. 4, 2019    (CN) .......................... 2019 1 0009579

(51) Int. Cl.
     *B01D 11/04*      (2006.01)
     *B01D 17/04*      (2006.01)
     (Continued)

(52) U.S. Cl.
     CPC ........ *B01D 11/0457* (2013.01); *B01D 17/041* (2013.01); *B01F 3/04531* (2013.01);
     (Continued)

(58) Field of Classification Search
     CPC .. B01D 11/04; B01D 11/0457; B01D 17/041; B01L 3/508; B01L 2200/0631;
     (Continued)

(56) References Cited

U.S. PATENT DOCUMENTS 2,854,202 A * 9/1958 Blume, Jr. .............. A47J 45/02
                                                      248/661
2,858,196 A * 10/1958 Ballard ................. B01F 1/0011
                                                      422/257

(Continued)

FOREIGN PATENT DOCUMENTS

| CN | 205109661 U | 3/2016 |
| CN | 108970660 A | 12/2018 |

*Primary Examiner* — Joseph W Drodge
(74) *Attorney, Agent, or Firm* — Bayramoglu Law Offices LLC

(57) ABSTRACT

An efficient automatic liquid-liquid extracting machine includes a body. At least one set of stirring extractor is arranged on the body, the stirring extractor includes a cylindrical separating funnel and a stirring motor that are fixed on the body, a bottom funnel opening of the cylindrical separating funnel is connected to a three-way liquid separating device, the stirring motor is arranged opposite to the opening of the cylindrical separating funnel, a motor shaft of the stirring motor is connected to a stirring device, and a stirring end of the stirring device penetrates into the cylindrical separating funnel. Since multiple mechanical stirring devices are used in the analysis of semi-volatile organics, the extraction process for multiple samples can be performed synchronously at the same time, and the solvent and the solute are brought into full contact due to the rotary mechanical stirring up and down.

5 Claims, 2 Drawing Sheets

(51) Int. Cl.
*B01F 3/04* (2006.01)
*B01F 15/00* (2006.01)
*B08B 3/04* (2006.01)

(52) U.S. Cl.
CPC .. *B01F 15/00662* (2013.01); *B01F 15/00668* (2013.01); *B01F 15/00733* (2013.01); *B08B 3/044* (2013.01)

(58) Field of Classification Search
CPC ............... G01N 1/38; G01N 1/4055; G01N 2001/4061; G01N 2030/062; G01N 2035/00465; G01N 2035/00514; G01N 2035/00534; G01N 2035/00544; B01F 3/04531; B01F 3/04588; B01F 3/205; B01F 3/2253; B01F 15/00662; B01F 15/00668; B01F 15/0072; B01F 15/00733; B01F 15/00746; B01F 15/00772; B01F 2215/0037; B01F 15/0201; B01F 15/0203; B01F 15/0266; B01F 15/0274; B01J 19/0066; B01J 2219/0037; B01J 2219/00479; B01J 2219/00481; B01J 2219/00891; C02F 1/26; B08B 3/00; B08B 3/04; B08B 3/044; B08B 3/10
USPC ................ 210/511, 634; 422/255–259, 527; 366/244, 245, 247, 249–251, 279, 285, 366/286, 343; 134/104.2, 104.3, 109
See application file for complete search history.

(56) References Cited

U.S. PATENT DOCUMENTS

| | | | | |
|---|---|---|---|---|
| 3,013,866 | A * | 12/1961 | Samaniego | B01D 11/0434 422/228 |
| 3,151,065 | A * | 9/1964 | Romine | B01D 29/66 210/108 |
| 3,325,255 | A * | 6/1967 | Treybal | B01D 11/0434 422/608 |
| 3,929,411 | A * | 12/1975 | Takano | G01N 35/1097 436/180 |
| 4,292,277 | A * | 9/1981 | Bonney | B01D 11/04 210/296 |
| 4,595,571 | A * | 6/1986 | Galik | B01D 11/0457 422/259 |
| 5,164,159 | A * | 11/1992 | Hayashi | B01J 19/004 203/3 |
| 6,113,860 | A | 9/2000 | Manninen | |
| 6,306,658 | B1 * | 10/2001 | Turner | B01F 15/00207 436/37 |
| 6,428,199 | B1 * | 8/2002 | Rupaner | B01F 7/162 366/172.1 |
| 2005/0232074 | A1 * | 10/2005 | Higashihara | B01F 13/0827 366/273 |
| 2012/0120757 | A1 | 5/2012 | Deal et al. | |
| 2016/0045861 | A1 * | 2/2016 | Aasberg-Petersen | C01B 3/386 423/245.1 |

* cited by examiner

EFFICIENT AUTOMATIC LIQUID-LIQUID EXTRACTING MACHINE

CROSS REFERENCE TO THE RELATED APPLICATIONS

This application is based upon and claims priority to Chinese Patent Application No. 201910009579.0, filed on Jan. 4, 2019, the entire contents of which are incorporated herein by reference.

TECHNICAL FIELD

The present disclosure relates to the field of extraction apparatus, and in particular to an efficient automatic liquid-liquid extracting machine.

BACKGROUND

Extraction, known as solvent extraction or liquid-liquid extraction, is also referred to as drawing, which is the unit operation for separating a mixture based on difference in solubility of components in the system in the solvent. It is a method of transferring the solute from one solvent into another solvent based on the difference in solubility or partition coefficient of the substance in two mutually insoluble (or slightly soluble) solvents, which is widely used in the chemical, metallurgical, food and other industries, and is commonly used in the petroleum refining industry.

Sample pretreatment preparation is an indispensable step in the analysis of semi-volatile organics. Optimizing this step is a key for this type of analysis. The extraction technique is widely used as a prerequisite for the analysis and determination of environmental samples. The main method of liquid-liquid extraction currently in use is to adopt a hand-operated separating funnel for preparing liquid samples. Such liquid-liquid extraction method has the following disadvantages. Firstly, it is very time-consuming, manual shaking or mechanical shaking separation technique is inefficient, and there is a need to remove the cork to release the gas in the shaking process, which greatly reduces the efficiency; secondly, the repeatability is poor, one sample is processed by two people or treated twice by one person; since it is very difficult to guarantee the same strength and way of shaking between the two times or between the two people, the reproducibility of the extraction result is poor. Thirdly, it is very difficult to clean the glass vessels used for extracting the liquid sample, because the inner surfaces of the vessels are difficult to reach, and poor cleaning may lead to cross contamination. Fourthly, due to the manual operation and frequent gas releasing in the process, the organic matters released in the process harms the human body.

SUMMARY

To this end, an efficient automatic liquid-liquid extracting machine is provided according to embodiments of the present disclosure, for the purpose of solving the problems of time-consuming, poor repeatability and difficult cleaning due to the use of a hand-operated separating funnel for preparing liquid samples in the prior art.

In order to achieve the above object, the following technical solutions are provided according to embodiments of the present disclosure.

An efficient automatic liquid-liquid extracting machine including a body is provided. At least one set of stirring extractor is arranged on the body, the stirring extractor includes a cylindrical separating funnel and a stirring motor that are fixed on the body, a bottom funnel opening of the cylindrical separating funnel is connected to a three-way liquid separating device, the stirring motor is arranged opposite to the opening of the cylindrical separating funnel, a motor shaft of the stirring motor is connected to a stirring device, and a stirring end of the stirring device penetrates into the cylindrical separating funnel.

In an embodiment of the present disclosure, a support rod is vertically arranged on the body, a clamp capable of moving up and down is arranged on the support rod, and the clamp is used for clamping the cylindrical separating funnel.

In an embodiment of the present disclosure, a sliding sleeve configured for being sleeved over the support rod is arranged on the clamp where the clamp is connected with the support rod, and a fastener is used for locking and connecting the sliding sleeve and the support rod.

In an embodiment of the present disclosure, the stirring device includes a central rod and a stirring blade, an upper end of the central rod is fixedly connected to the stirring motor, the stirring blade is arranged on the bottom end of the central rod, and the central rod penetrates into the cylindrical separating funnel.

In an embodiment of the present disclosure, the stirring blade is an anchor blade, and a rotation section of the stirring blade has a diameter ranging from 4 cm to 6 cm.

In an embodiment of the present disclosure, a depth by which the central rod penetrates into the cylindrical separating funnel ranges from 18 cm to 20 cm.

In an embodiment of the present disclosure, a cleaning device is arranged on the body, the cleaning device includes a water outlet pipe, a water feeder and a water suction pipe, an outlet end of the water feeder is connected to the water outlet pipe, and an inlet end of the water feeder is connected to the water suction pipe.

In an embodiment of the present disclosure, the water feeder is a hand-pressed valve, and the water outlet pipe is a hose.

In an embodiment of the present disclosure, the water feeder is an electric water pump, the water outlet pipe is obliquely arranged on the body, an included angle a is formed between the water outlet pipe and the inner wall of the cylindrical separating funnel, and the angle $\alpha$ ranges from 30 degrees to 60 degrees.

In an embodiment of the present disclosure, in a case where the number of the stirring extractors is plural, a plurality of stirring motors are connected in parallel by wiring and then connected to a central control box.

According to the embodiments of the present disclosure, the following advantages are obtained.

With the efficient automatic liquid-liquid extracting machine according to the embodiments of the present disclosure, since multiple mechanical stirring devices are used in the analysis of semi-volatile organics, the extraction process for multiple samples can be performed synchronously at the same time, and the solvent and the solute are brought into full contact due to the rotary mechanical stirring up and down, thus achieving efficient extraction.

The efficient automatic liquid-liquid extracting machine according to the embodiments of the disclosure is provided with an open extraction vessel, so that there is no need to release the gas during the extraction process, further reducing the extraction time length; moreover, the consistency of the extraction time length, the extraction mode and strength at each time are ensured by using the mechanical stirring, and therefore the extraction efficiency is highly reproducible.

For the efficient automatic liquid-liquid extracting machine according to the embodiments of the present disclosure, an automatic liquid-filling cleaning pipe is used, and it is more convenient and simple to clean the extraction vessel with better effect. In operation, there is no need for the people to always observe the operation after setting the time length. Therefore, the human injury due to the inhalation of organic solvents is avoided.

BRIEF DESCRIPTION OF THE DRAWINGS

The accompanying drawings that are required to be used in the description of the embodiments or the conventional technology are described briefly below, so that the technical solutions according to the embodiments of the present disclosure or according to the conventional technology will become clearer. It is apparent that the accompanying drawings in the following description are only illustrative. For those skilled in the art, other accompanying drawings may be obtained according to these drawings provided, without any creative work.

The structure, proportion, size and the like shown in the present specification are only used to cooperate with the contents disclosed in the specification for those skilled in the art to understand and read, and are not intended to limit the conditions with which the present disclosure can be implemented. Therefore, they have no practical significance in a technical sense. Any modification to the structure, any change of the proportions or any adjustment of the size should fall within the scope covered by the technical contents disclosed in the present disclosure without affecting the effects and objects that can be achieved by the present disclosure.

Figure 1:
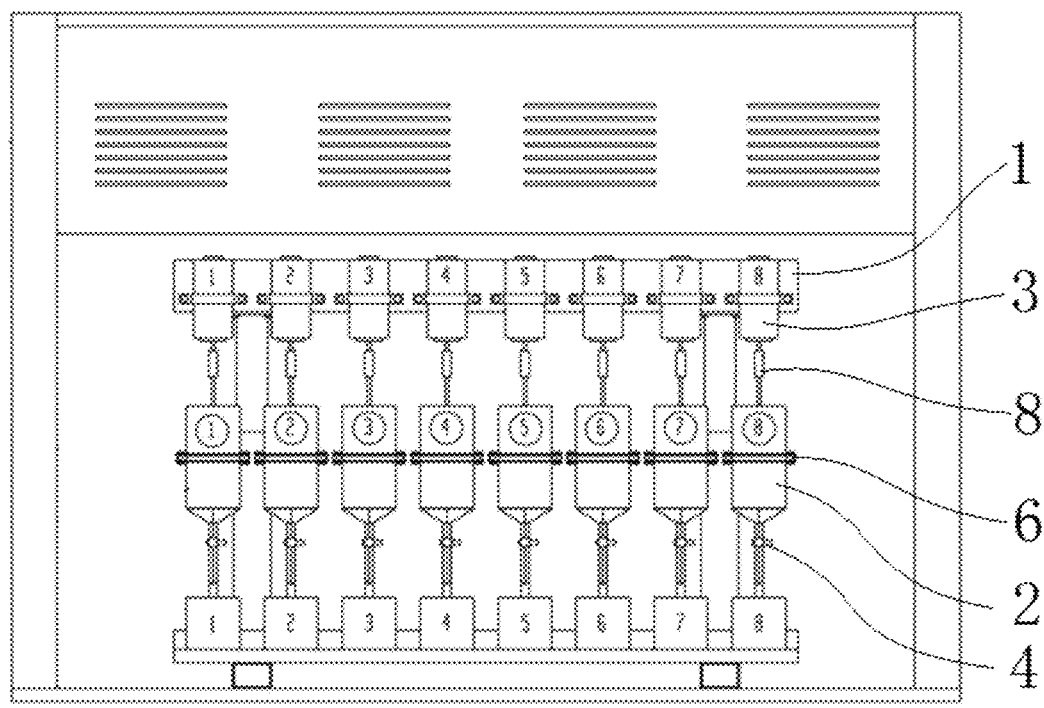
FIG. 1 is an overall structural view of an efficient automatic liquid-liquid extracting machine according to an embodiment of the present disclosure.

In the drawings:
1: body; 2: cylindrical separating funnel; 3: stirring motor; 4: three-way liquid separating device; 5: support rod; 6: clamping end; 7: fixed end; 8: central rod; 9: stirring blade; 10: water outlet pipe.

DETAILED DESCRIPTION OF THE EMBODIMENTS

The implementations of the present disclosure is described in the specific embodiments below, and other advantages and functions of the present disclosure can be readily understood by those skilled in the art from the contents disclosed in the specification. It is apparent that the described embodiments are part of the embodiments of the present disclosure, instead all of them. All the other embodiments obtained by those skilled in the art on the basis of the embodiments of the present disclosure without creative efforts will fall within the scope of protection of the present disclosure.

The terms "upper", "lower", "left", "right", "intermediate" used in the specification are merely for the purpose of facilitating description, and are not intended to limit the scope of the disclosure. The change or adjustment of the relative relationship thereof should be considered as falling within the scope of the present disclosure without substantively changing the technical content.

Figure 2:
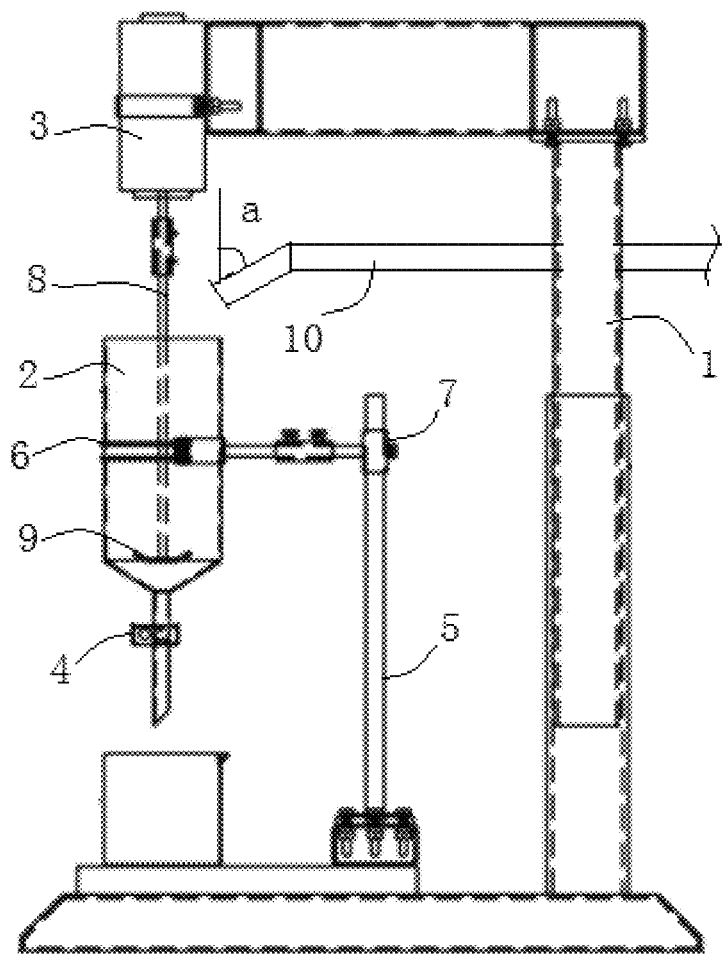
FIG. 2 is a side structural view of a stirring extractor shown in FIG. 1.

As shown in FIGS. 1-2, an efficient automatic liquid-liquid extracting machine is provided, which includes a body 1. At least one set of stirring extractor is arranged on the body 1, the stirring extractor includes a cylindrical separating funnel 2 and a stirring motor 3 that are fixed on the body 1, and a bottom funnel opening of the cylindrical separating funnel 2 is connected to a three-way liquid separating device 4, preferably, a three-way valve. The stirring motor 3 is arranged opposite to the opening of the cylindrical separating funnel, a motor shaft of the stirring motor 3 is connected to a stirring device, and a stirring end of the stirring device penetrates into the cylindrical separating funnel 2. In a case where the number of the stirring extractors is plural, a plurality of stirring motors are connected in parallel by wiring and then connected to a central control box.

A vertical support rod 5 is provided on the body 1, and a clamp capable of moving up and down is provided on the support rod 5. The clamp includes a clamping end 6 and a fixed end 7, the clamping end 6 is in a shape of a clamp for holding the cylindrical separating funnel 2, and the fixed end 7 is sleeved over the support rod 5 and locked by a fastener. In the embodiment, a sliding sleeve configured for being sleeved over the support rod 5 is arranged on the clamp where the clamp is connected with the support rod 5, and the sliding sleeve is provided with a fastener for tightening the support rod 5.

The stirring device includes a central rod 8 and a stirring blade 9, an upper end of the central rod 8 is fixedly connected to the stirring motor 3, the stirring blade 9 is arranged on the bottom end of the central rod 8, and the central rod 8 penetrates into the cylindrical separating funnel 2. The depth by which the central rod 8 penetrates into the cylindrical separating funnel 2 ranges from 18 cm to 20 cm. The clamp for fixing the cylindrical separating funnel 2 is adjustable up and down, therefore the penetrating depth of the stirring blade 9 is adjustable. In this embodiment, the stirring blade 9 is an anchor blade, and a rotation section of the stirring blade 9 has a diameter ranging from 4 cm to 6 cm, preferably 5.6 cm in diameter.

A cleaning device is arranged on the body 1. The cleaning device includes a water outlet pipe 10, a water feeder and a water suction pipe, an outlet end of the water feeder is connected to the water outlet pipe 10, and an inlet end of the water feeder is connected to the water suction pipe. The cleaning device is a manual cleaning device or an automatic cleaning device, specifically:

For a manual cleaning device, the water feeder is a hand-pressed valve, the water outlet pipe 10 is a PTFE hose, and a clamp for fixing the hose may be arranged on the body 1. In cleaning, the hose is removed from the clamp, and the cylindrical separating funnels are cleaned one by one with the hose held by hand; and For an automatic cleaning device, the water feeder is an electric water pump. As shown in FIG. 2, the water outlet pipe 10 is obliquely arranged on the body 1, an included angle α is formed between the water outlet pipe 10 and the inner wall of the cylindrical separating funnel, and the angle α ranges from 30 degrees to 60 degrees. If there are multiple cylindrical separating funnels, each of the cylindrical separating funnels is provided with a water outlet pipe 10, the water outlet pipes 10 are each connected to a water separator, and the water separator is connected to the electric water pump, realizing automatic water supplying and separate washing.

While the present disclosure is described in detail with reference to the specific embodiments and general description above, it is apparent to those skilled in the art that some modifications or improvements may be made on the basis of the present disclosure. Therefore, such modifications or improvements made without departing from the spirit of the disclosure will all fall within the scope of protection of the disclosure.

What is claimed is:

1. An efficient liquid-liquid extracting machine, comprising a body, wherein a plurality of stirring extractors is uniformly arranged side by side and supported by an elongate base extending outward from a front of the body, each stirring extractor comprises a cylindrical separating funnel having an open top and a stirring motor, the cylindrical separating funnel and the stirring motor are fixed on the body, a bottom funnel opening of the cylindrical separating funnel is connected to a three-way liquid separating device, the stirring motor is arranged opposite to the bottom funnel opening of the cylindrical separating funnel, a motor shaft of the stirring motor is connected to a stirring device, and a stirring end of the stirring device penetrates into the cylindrical separating funnel, wherein the stirring device comprises a central rod and a stirring blade, an upper end of the central rod is fixedly connected to the stirring motor, the stirring blade is arranged on a bottom end of the central rod, and the central rod penetrates into the cylindrical separating funnel, wherein the stirring blade is an anchor blade, and a rotation section of the stirring blade has a diameter ranging from 4 cm to 6 cm, wherein the central rod penetrates into the cylindrical separating funnel by a depth ranging from 18 cm to 20 cm, wherein a cleaning device is arranged on the body, the cleaning device comprises a water outlet pipe, a water feeder and a water suction pipe, an outlet end of the water feeder is connected to the water outlet pipe, and an inlet end of the water feeder is connected to the water suction pipe, and wherein the water feeder is an electric water pump, the water outlet pipe is obliquely arranged on the body, an included angle a is formed between the water outlet pipe and an inner wall of the cylindrical separating funnel, and the included angle a ranges from 30 degrees to 60 degrees.

2. The efficient liquid-liquid extracting machine according to claim 1, wherein a support rod is vertically arranged on the body and a clamp configured to move up and down is arranged on the support rod.

3. The efficient liquid-liquid extracting machine according to claim 2, wherein a sliding sleeve sleeved over the support rod is arranged on a connection portion between the clamp and the support rod, and a fastener is configured to lock and connect the sliding sleeve and the support rod.

4. The efficient liquid-liquid extracting machine according to claim 2, wherein the water feeder is a hand-pressed valve, and the water outlet pipe is a hose.

5. The efficient liquid-liquid extracting machine according to claim 1, wherein a the stirring motors of the stirring extractors are connected in parallel by wiring and are connected to a central control box.

* * * * *